(12) United States Patent
Fickie et al.

(10) Patent No.: US 7,685,368 B1
(45) Date of Patent: Mar. 23, 2010

(54) METHODS AND APPARATUS FOR REMOVING DATA FROM A CACHE

(75) Inventors: Kenneth E. Fickie, Ashland, MA (US);
Pramod Kulyadi Pai, Karnataka (IN);
Steven S. Teng, Littleton, MA (US);
Ethan D. Roberts, Natick, MA (US);
Saravanan Chithambaram, Cambridge, MA (US); Richard T. Simon, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 570 days.

(21) Appl. No.: 11/477,022

(22) Filed: Jun. 28, 2006

(51) Int. Cl.
*G06F 12/00* (2006.01)
(52) U.S. Cl. .................................... 711/133
(58) Field of Classification Search ................. 711/133
See application file for complete search history.

(56) References Cited

U.S. PATENT DOCUMENTS

| | | | | |
|---|---|---|---|---|
| 5,909,695 A * | 6/1999 | Wong et al. | ................. | 711/133 |
| 6,115,789 A * | 9/2000 | Durham et al. | ............. | 711/118 |
| 6,389,505 B1 * | 5/2002 | Emma et al. | ................ | 711/106 |
| 6,457,139 B1 * | 9/2002 | D'Errico et al. | ................ | 714/5 |
| 2003/0009630 A1 * | 1/2003 | Morris et al. | ................ | 711/133 |
| 2004/0073740 A1 * | 4/2004 | Cypher | ........................ | 711/3 |
| 2004/0181633 A1 * | 9/2004 | Azuma | ........................ | 711/133 |
| 2005/0044080 A1 * | 2/2005 | Fridella et al. | ................ | 707/10 |

* cited by examiner

*Primary Examiner*—Sheng-Jen Tsai
*Assistant Examiner*—Ryan Dare
(74) *Attorney, Agent, or Firm*—Chapin IP Law, LLC; Barry W. Chapin, Esq.

(57) ABSTRACT

Methods and apparatus for removing data from a cache are disclosed. The data may be one or more objects that are stored in a first cache. Each object stored in the first cache has an associated reference that is stored in a second cache. Each such reference has an associated timer. As a program accesses an object stored in the first cache, the timer associated with its reference is reset. A harvester process parses through the second cache over a period of time, locking a section of the second cache and determining if any timers associated with references therein have timed out. The harvester process removes any such timed-out timers from the second cache. A garbage collection process parses through the first cache, removing any objects therein that do not have an associated reference in the second cache.

21 Claims, 5 Drawing Sheets

METHODS AND APPARATUS FOR REMOVING DATA FROM A CACHE

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction.

SUMMARY

Conventional technologies for removing data from a cache work well at solving the primary problem of freeing space in the cache for more pertinent or recent data. However, these technologies do not address a secondary issue, namely recycling data through the cache frequently. For example, in the console component of the ECC family of products, as a user manipulates graphical objects in a graphical user interface to manage the various elements of a SAN, data concerning the elements are placed in a cache. Particularly with very large SANs, the cache may not be large enough to hold all of the data needed by the console as the user manages more and more elements of the SAN. A conventional cache eviction scheme will remove, for example, data no longer needed by the console, so as to make room in the cache for data that is currently needed by the console. However, a short while later, the console may need to reload some of that recently removed data into the cache, as the user wishes to again access that data via the console. This occurrence may repeat frequently, causing the same data to consistently be placed into, then removed from, then placed back into, the cache. It would be more efficient to hold such frequently used data in the cache for a longer period of time, which would reduce the recycling effect, so that the resources previously used to recycle the data into and out of the cache may be devoted to other purposes.

Embodiments disclosed below significantly overcome such a recycling problem by providing a timer-based cache eviction scheme, where the data, such as managed objects, are stored in a first cache and references to that data are stored in a second cache. Timers are associated with the references in the second cache. Each time a managed object in the first cache is accessed, for example by the console component, the timer associated with the reference to that managed object is reset. Thus, managed objects that are accessed frequently remain in the cache for longer periods of time, reducing the recycling effect. A harvester process continuously examines the second cache, parsing through different parts of the second cache and locking the part currently being examined, to determine if any of the timers therein have timed out. When the harvester process finds a timer that has timed out, the process removes the reference that timer is associated with from the second cache. At the same time that the harvester process examines the second cache, a garbage collection process is examining the first cache. When the garbage collection process detects that a managed object is not referenced by a reference in the second cache, the garbage collection process removes that managed object from the first cache.

More particularly, in an embodiment there is provided a method of removing an object from a first cache, wherein each object in the first cache is associated with a reference in a second cache. The method includes associating each reference in the second cache with a timer; locking a subset of the second cache; determining those references in the locked subset of the second cache that have associated timers that have timed out; removing any such reference from the second cache; and deleting any objects from the first cache that do not have an associated reference in the second cache.

In a related embodiment, the objects in the first cache may belong to different classes of objects and the method may include organizing the references in the second cache according to the class of their respective associated object in the first cache. In a further related embodiment, associating may include associating each reference in the second cache with a timer, wherein the timer associated with a reference depends on a class of the object that the reference is associated with. In a related embodiment, associating may include associating each reference in the second cache with a timer, wherein the cycle of the timer associated with a reference depends on the class of the object that the reference is associated with.

In another related embodiment, the method may include performing the steps of locking, determining, and removing for each subset of the second cache in a period of time. In a further related embodiment, performing may include performing the steps of locking, determining, and removing for each subset of the second cache in a harvester period of time that is less than half of the period of the timer with the shortest cycle in the locked subset of the second cache; and determining may include: detecting the classes of the objects that are associated with the references in the locked subset of the second cache; verifying the cycle of the associated timer for each reference that is associated with a different class of object; and checking the timers of the references by comparing the current value of a timer to the verified cycle of that timer.

In yet another related embodiment, objects in the first cache may be managed objects representing the components in a storage area network, and the method may include receiving a signal indicating that a managed object in the first cache has been accessed; detecting the class of the accessed managed object and the cycle of the timer associated with the reference that is associated with the accessed managed object; and resetting the timer associated with a reference in the second cache that is associated with the accessed managed object in the first cache, wherein the cycle of the timer depends on the class of the accessed managed object.

In another embodiment there is provided a computer system including a memory; a processor; a display; an interconnection mechanism coupling the memory, the processor and the display allowing communication there between; wherein the memory is encoded with a removal application, that when executed in the processor, provides a removal process that removes an object from a first cache, wherein each object in the first cache is associated with a reference in a second cache, by causing the computer system to perform the operations of: associating each reference in the second cache with a timer; locking a subset of the second cache; determining those references in the locked subset of the second cache that have associated timers that have timed out; removing any such reference from the second cache; and deleting any objects from the first cache that do not have an associated reference in the second cache.

In yet another embodiment there is provided a computer program product, stored on computer readable medium, to remove an object from a first cache, wherein each object in the first cache is associated with a reference in a second cache. The computer program product includes computer program code for associating each reference in the second cache with a timer; computer program code for locking a subset of the second cache; computer program code for determining those references in the locked subset of the second cache that have associated timers that have timed out; computer program code for removing any such reference from the second cache; and computer program code for deleting any objects from the first cache that do not have an associated reference in the second cache.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, disclosed embodiments include methods and apparatus for removing data, such as one or more objects, from a cache, while maintaining other data in the cache. In using a console application, such as the console component of the ECC software package, to manage a SAN, a user selects various graphical objects that represent components of the SAN. Each time the user selects a graphical object, data about the component of the SAN that is represented by that graphical object is loaded from a database into a first cache. The data is in the form of a managed object. A reference, which may be a pointer to the managed object, is loaded into a second cache. Depending on the size and scale of the SAN being managed, the first cache may quickly fill up, requiring that some data be cleared from the first cache to allow new data to be stored in the first cache. This cleared data may later be returned to the first cache when the user, in managing the SAN, clicks on the graphical object representing the component of the SAN described by the cleared data. As data is continually recycled through the first cache in this manner, valuable processing resources that could be devoted to other tasks are wasted.

Embodiments disclosed herein alleviate the recycling effect described above by intelligently maintaining some data in the first cache, as described below. In this manner, processing resources are balanced between maintaining data in the first cache and bringing new data into the first cache.

Figure 1:
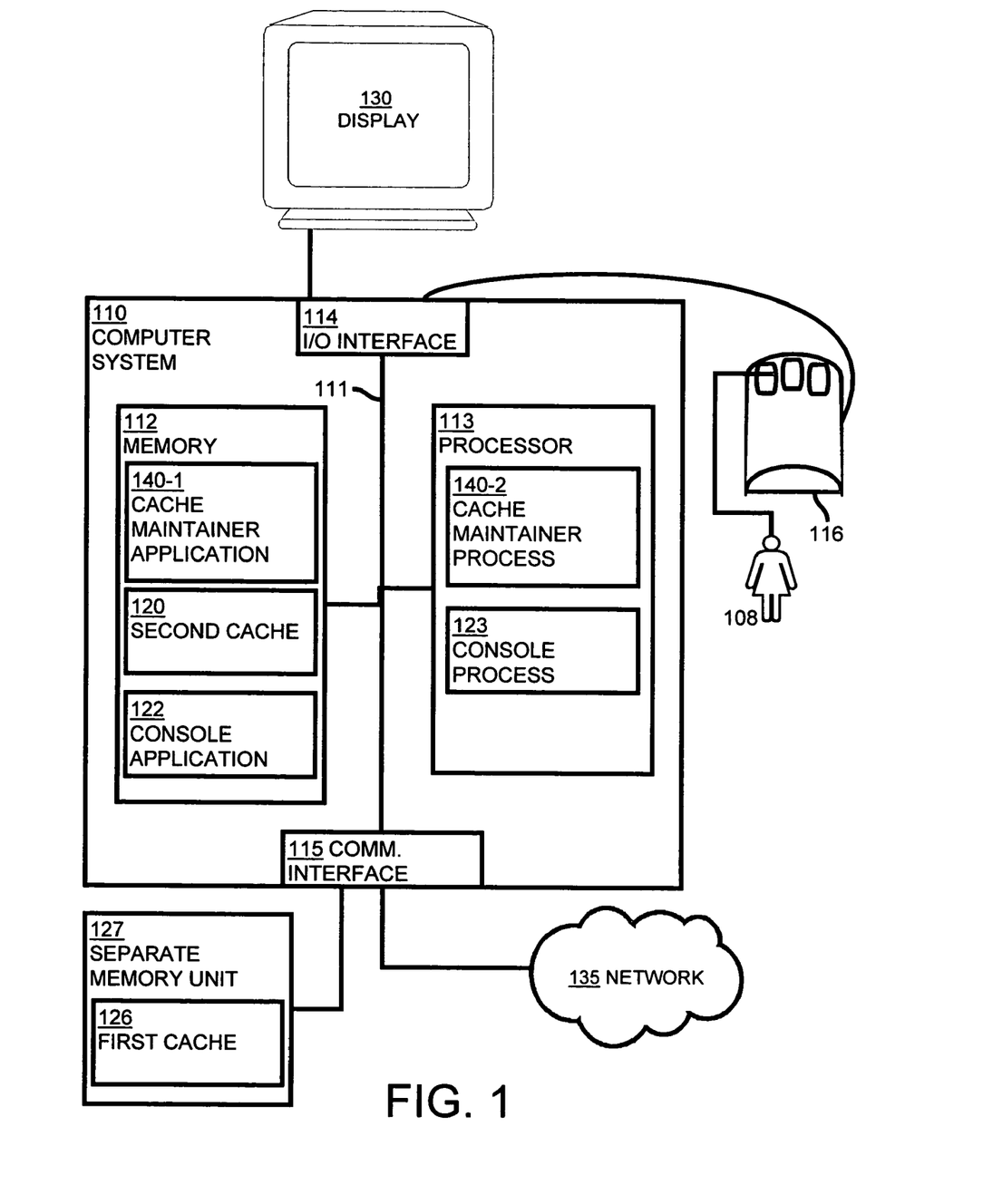
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a cache maintainer application 140-1 and a cache maintainer process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network (SAN) to provide input commands and generally administer the SAN through the graphical user interface (not shown) that is provided on a display 130. The communications interface 115 enables the computer system 110 to communicate with other devices (e.g., components of the SAN) on a network 135.

The memory system 112 is any type of computer readable medium and in this example is encoded with a cache maintainer application 140-1 that includes cache maintainer process 140-2. The memory system 112 also includes a cache 120, referred to throughout as a second cache 120. The memory system 112 may further include a first cache 126, or the first cache 126 may be located in a separate memory unit 127 that the computer system 110 communications with via the communications interface 115, as shown in FIG. 1. The cache maintainer application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the cache maintainer application 140-1 as well as the console application 122. Execution of the cache maintainer application 140-1 in this manner produces processing functionality in a cache maintainer process 140-2. Similarly, execution of the console application 122 produces processing functionality in a console process 123. In other words, the cache maintainer process 140-2 represents one or more portions or runtime instances of the cache maintainer application 140-1 performing or executing within or upon the processor 113 in the computer system 110 at runtime.

It is noted that example configurations disclosed herein include the cache maintainer application 140-1 itself including the cache maintainer process 140-2 (i.e., in the form of unexecuted or non-performing logic instructions and/or data). The cache maintainer application 140-1 may be stored on a computer readable medium (such as a floppy disk), hard disk, electronic, magnetic, optical or other computer readable medium. The cache maintainer application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the cache maintainer application 140-1 in the processor 113 as the cache maintainer process 140-2. Those skilled in the art will understand that the computer system 110 may include other processes and/or software and hardware components, such as an operating system not shown in this example.

Figure 2:
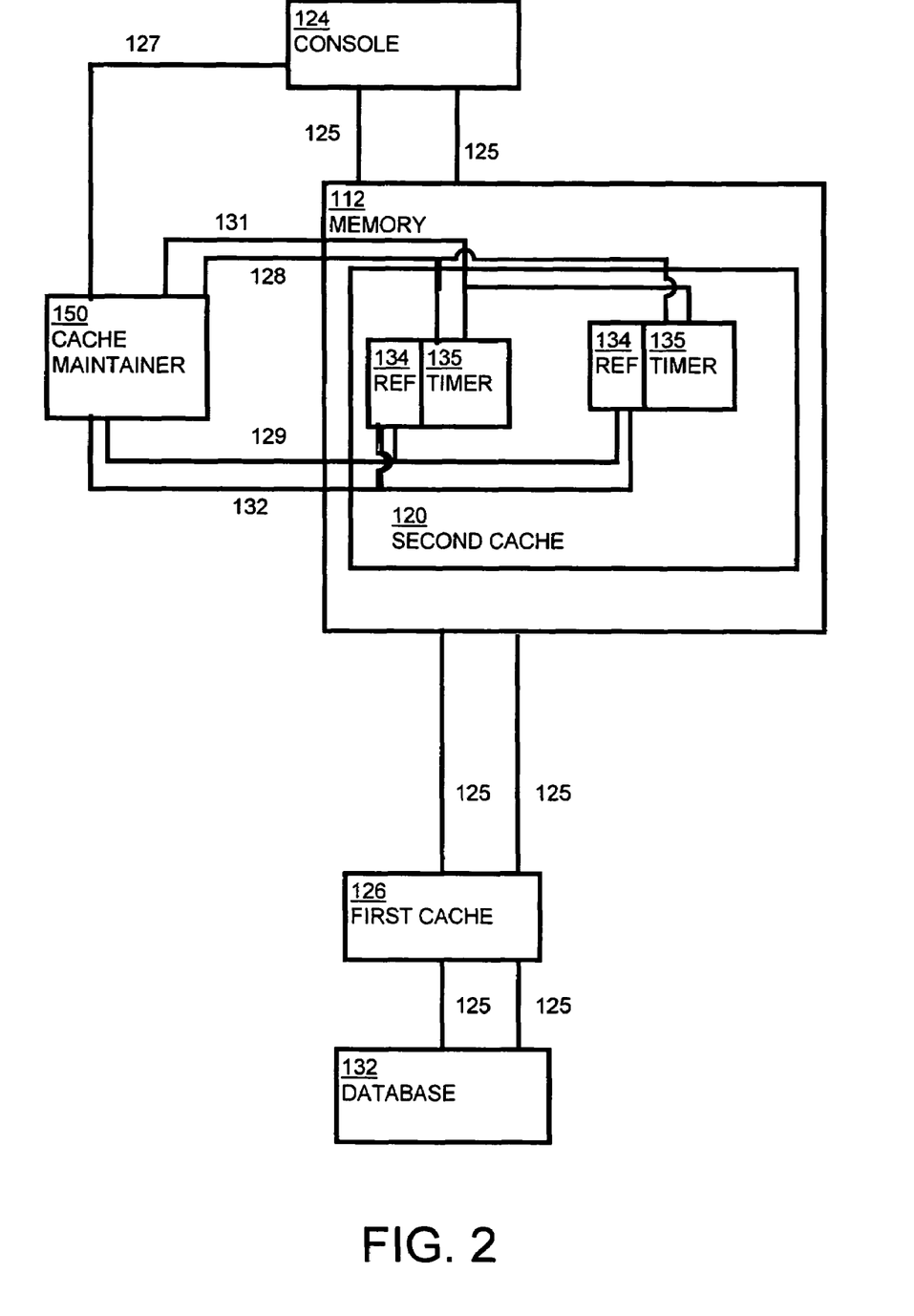
FIG. 2 shows a component diagram of an application that executes on the computer system of FIG. 1.
Figure 3:
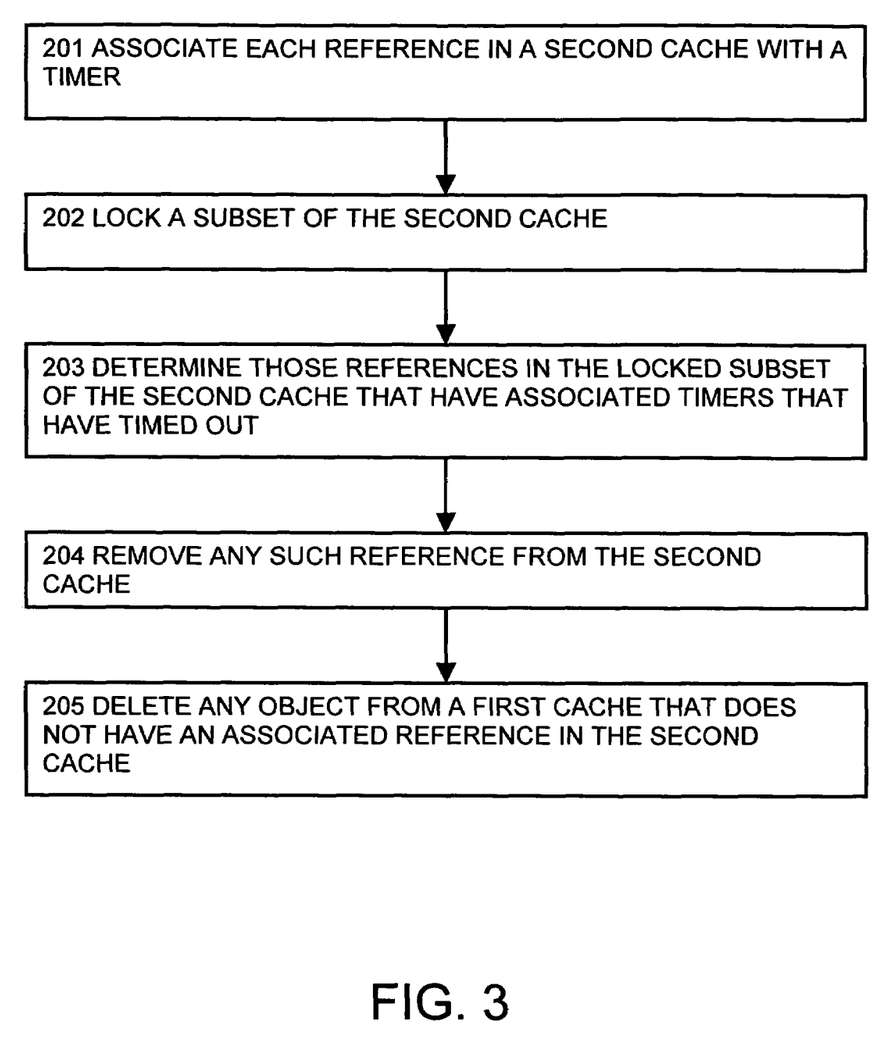
FIG. 3 illustrates a flowchart of a procedure performed by the system of FIG. 1 when deleting an object from a first cache when a reference in a second cache associated with that object has an associated timer time out.
Figure 4:
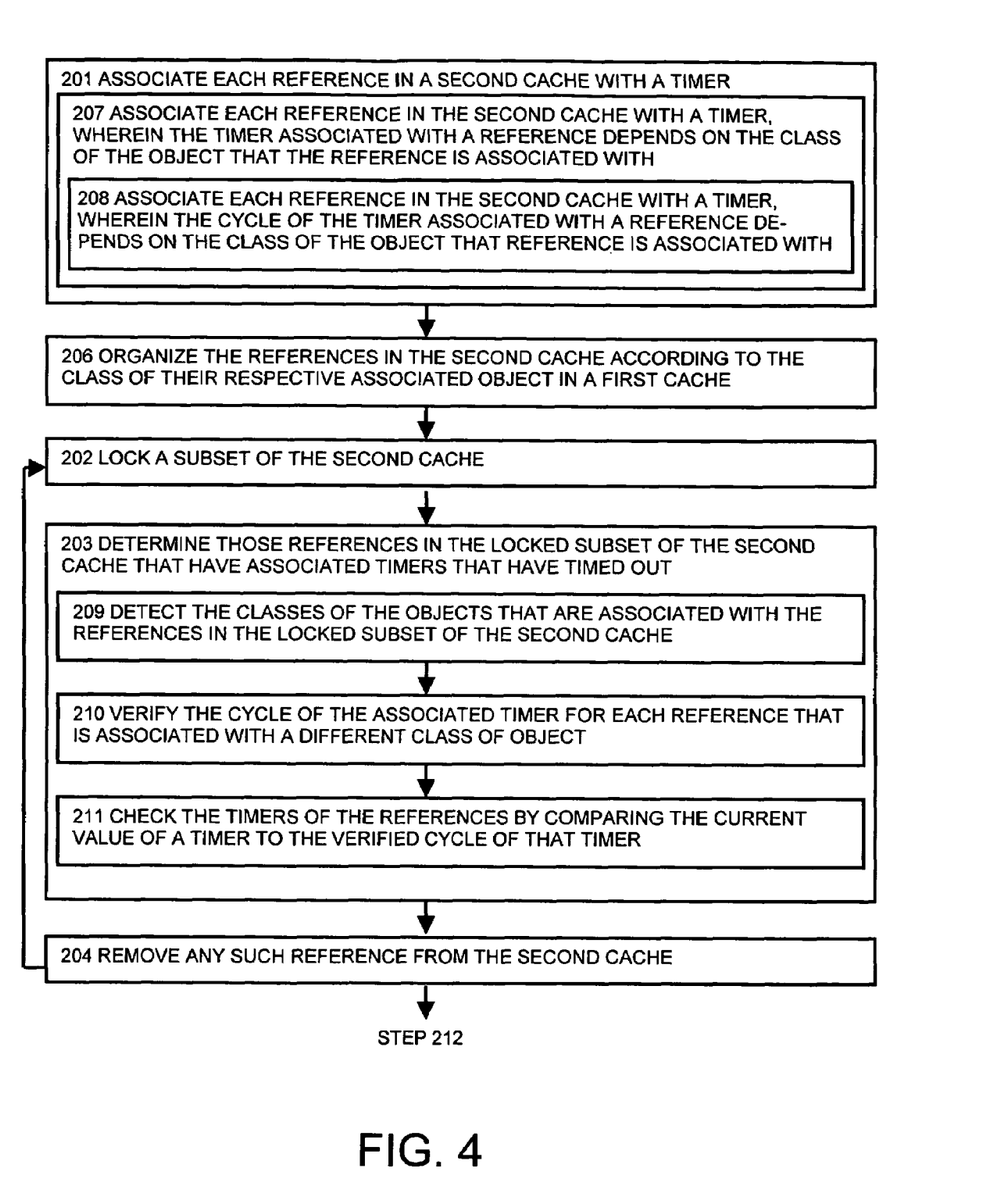
FIGS. 4 and 5 illustrate a flowchart of a procedure performed by the system of FIG. 1 when deleting an object from a first cache when a reference in a second cache associated with that object has an associated timer time out, when the characteristics of the timer depend on the class of the object.
Figure 5:
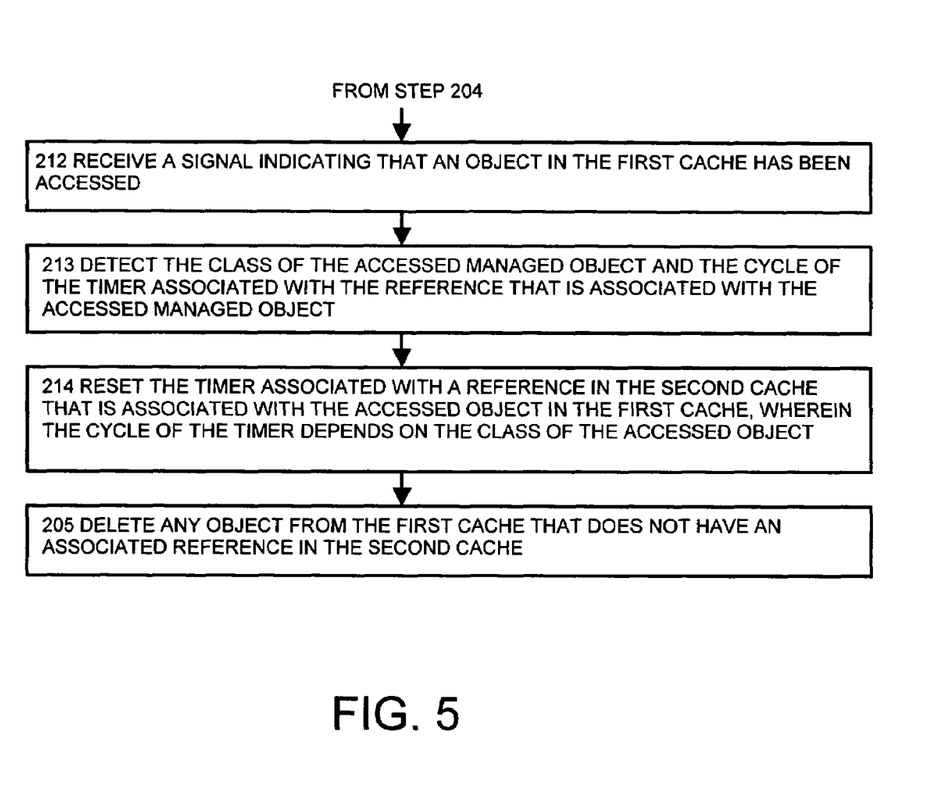

FIG. 2 shows a component diagram of a cache maintainer application that executes on the computer system of FIG. 1. FIG. 3 illustrates a flowchart of a procedure performed by the system of FIG. 1 to delete an object (not shown) from the first cache 126 when a reference 134 in the second cache 120 associated with that object has an associated timer 135 time out. FIGS. 4 and 5 illustrate a flowchart of a further procedure performed by the system of FIG. 1 when deleting an object (not shown) from the first cache 126 when the reference 134 in the second cache 120 associated with that object (not shown) has an associated timer 135 time out, when the characteristics of the timer 135 depend on the class of the object.

In FIG. 2, cache maintainer 150 is a module that performs the logical steps of the cache maintainer application 140-1, executed in the processor as cache maintainer process 140-2. The console 124 is a module that performs the logical steps of the console application 122, executed in the processor as console process 123. Both the cache maintainer 150 and the console 124 communicate with the first cache 126 and the second cache 120.

When a user operates the console 124 to manage the SAN, the console 124 requests data about the SAN and its components from a database 132. This data is in the form of managed objects, wherein each managed object represents a different component of the SAN and contains various information about that component. The managed objects may belong to different classes, wherein each class of a managed object describes the respective type of SAN component that the managed object contains information about. Thus, the information contained within a managed object may depend at least on the type of component/class of the managed object, and the requests made by the console 124 may be termed object requests 125. A response to an object request 125 includes the class of the requested managed object.

The managed objects containing information about the components of the SAN are loaded into the first cache 126. Each time a new managed object is loaded into the first cache 126, a corresponding reference 134 is loaded into the second cache 120. Each reference 134 may be a pointer to the corresponding managed object that is stored in the first cache 126. A reference 134 may be unique to its corresponding managed object, and that unique reference may be re-used when its corresponding managed object is loaded into the first cache 126. Whenever the console 124 requires the information contained in a managed object that is stored in the first cache 126, the console 124 accesses the managed object's reference 134 in the second cache 120, and thereby retrieves information contained within the managed object. The console also receives the class of the requested managed object.

The cache maintainer 150 may request that the console 122 pass along the class of the managed object corresponding to the newly loaded reference 134. The cache maintainer 150 may then organize the references 134 in the second cache 120 according to the class of their respective associated object in the first cache 126, step 206. The cache maintainer 150 may organize the references 134 in any other manner, such as according to the system time when the reference 134 was loaded into the second cache 120.

After a reference 134 is loaded into the second cache 120, the cache maintainer 150 associates a timer 135 with that reference, step 201, by sending a timer assign signal 129. A timer 135 is associated with each reference 134 that is stored within the second cache 120. The timer 135 may be a countdown timer, having a cycle that runs from an initial time to an end time, where the initial time is a value that is greater than the value of the end time. The timer 135 may also be a count-up timer, where the initial time is a value that is less than the value of the end time. A timer's cycle, then, regardless of whether the timer is a countdown or a count-up timer, is the amount of time between the initial time and the end time. In a preferred embodiment, the timer 135 is countdown timer than counts down to zero.

The classes of the respective managed objects with corresponding references 134 stored in the second cache 120 may also be used by the cache maintainer 150 when associated the timers 135 with their respective references 134. For example, the cache maintainer 150 may associate a timer 135 with a reference 134 depending on the class of the managed object that the reference 134 is itself associated with, step 207. The cache maintainer 150 is thus able to intelligently incorporate information about the usage patterns of different users of the console 124. For example, if a particular first class of managed object tends to be accessed by the console 124 frequently, say every ten minutes, but still less frequently than managed objects in a second class, the cache maintainer 150 is able to assign timers 135 with a longer cycle to the references 134 of the managed objects in the first class, so that the less frequently accessed managed objects will remain in the first cache 126 for a longer period of time. Thus, the cache maintainer 150 may additionally associate references 134 with timers 135 whose cycle depends on the class of the managed objects stored in the first cache 126 that the references 134 stored in the second cache 120 are associated with, step 208.

To maintain the first cache 126 so that some managed objects are kept and others are discarded, the cache maintainer 150 checks the timers 135 that are associated with the references 134 in the second cache 120. The cache maintainer 150 does not check all the timers 135 at the same time, but rather goes through subsets of the second cache 120, where a subset is some portion of the second cache 120 that is smaller than the entirety of the second cache 120. Each subset contains at least one, and usually many, references 134 and their associated timers 135. Before checking the timers in a subset of the second cache 120, the cache maintainer 150 locks that subset of the second cache 120, step 202. This prohibits the console 124 or any other applications or processes that may access the second cache 120 from making any changes to the references 134 stored in the locked subset of the second cache 120. A subset of the second cache 120 remains locked until the cache maintainer 150 has checked each timer 135 associated with a reference 134 that is located in that subset. The total period of time for which a subset of the second cache 120 remains locked is known as a harvester period of time. During each harvester period of time, the cache maintainer 150 locks a subset of the second cache 120 and performs the necessary operations to check whether any timers 135 associated with references 134 stored in that subset have timed out, that is, reached the end of their respective timer cycle. These necessary operations are described below in regard to FIG. 4. The cache maintainer 150 repeats the locking step 202 and the other steps (203 and 204) as described below for each subset of the second cache 120, and will continue to repeat them over and over, parsing through the second cache 120 many times until the cache maintainer process 140-2 ceases executing. In a preferred embodiment, the locking step 202 and other steps (203 and 204) as described below are performed in a harvester period of time that is less than half of the period of the timer 135 that has the shortest cycle in the locked subset of the second cache 120.

After the cache maintainer 150 locks a subset of the second cache 120, the cache maintainer 150 determines those references 134 that are located in the locked subset that have associated timers 135 that have timed out, step 203. The cache maintainer 150 does this by first detecting the classes of the objects that are associated with the references 134 in the locked subset of the second cache, step 209. The cache maintainer 150, having the class or classes of the objects in the locked subset, is able to verify what the cycle of each of the timers 135 in the locked subset should be, step 210, as the cache maintainer 150 assigned the timers based on the classes of the managed objects associated with the references 134 that the timers 135 themselves are associated with. Finally, the cache maintainer 150 checks the timers 135 of the references 134 in the locked subset of the second cache 120 by comparing the current value of each timer to the verified cycle of that timer, step 211. To perform the check, the cache maintainer 150 sends a timer check signal 131 to each respective timer 135 in the locked subset of the second cache 120, which returns the current value of that timer. For any timers 135 in the locked subset that have timed out, the cache maintainer 150 removes the associated reference 134 from the second cache, step 204, by sending a reference remove signal 132.

While the cache maintainer 150 is parsing through the second cache 120, a separate process (not shown) is simultaneously monitoring the first cache 126. When this process finds a managed object in the first cache 126 that does not have any associated reference(s) in the second cache 120, the process deletes any such objects from the first cache 126, step 205. These objects may later be returned to the first cache 126, if the user 108 through the console 124 requests the information for a SAN component that is contained with those managed objects. When this occurs, the same references 134 that were previously associated with those managed objects may be reassociated with them.

The cache maintainer 150 is able to maintain frequently used managed objects in the first cache 126 through resetting the timers 135 of the references 134 stored in the second cache 120 that correspond to those managed objects. Whenever the console 124 sends an object request 125 to the second cache 120, the console 124 also sends a reset signal 127 to the cache maintainer 150. The reset signal 127 notifies the cache maintainer 150 that a managed object stored in the first cache 126 is being accessed via an object request 125 to the second cache 120. When the cache maintainer 150 receives the reset signal 127, step 212, the cache maintainer 150 must send a signal to the appropriate timer 135 in the second cache 120 to reset that timer 135 to its initial time. If the timer 135 depends on the class of the managed object that corresponds with the reference 134 that the timer 135 is associated with, the cache maintainer 150 must also detect the class of that managed object, step 213. The cache maintainer 150 detects the class by examining the reset signal 127, which will contain the class of the requested managed object. Having detected the class of the managed object that is being accessed by the console 124, the cache maintainer 150 resets the appropriate timer 135 to its initial time, step 214, by sending a timer reset signal 128 to the timer 135 so that the cycle of the timer 135 will commence running from the initial time. This process repeats itself every time the console 124 accesses a managed object that is stored in the first cache 126.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of removing an object from a first cache, wherein each object in the first cache is associated with a reference in a second cache, the method comprising:
    associating each reference in the second cache with a timer;
    locking a subset of the second cache;
    determining those references in the locked subset of the second cache that have associated timers that have timed out;
    removing any such reference from the second cache; and deleting any objects from the first cache that do not have an associated reference in the second cache;
wherein the objects in the first cache belong to different classes of objects, each class corresponding to a particular type of Storage Area Network component, and the method comprises:
organizing the references in the second cache according to the class of their respective associated object in the first cache.

2. The method of claim 1 wherein associating comprises:
associating each reference in the second cache with a timer, wherein the timer associated with a reference depends on a class of the object that the reference is associated with.

3. The method of claim 2 wherein associating comprises:
associating each reference in the second cache with a timer, wherein the cycle of the timer associated with a reference depends on the class of the object that the reference is associated with.

4. The method of claim 2 comprising:
performing the steps of locking, determining, and removing for each subset of the second cache in a harvester period of time.

5. The method of claim 4 wherein performing comprises:
performing the steps of locking, determining, and removing for each subset of the second cache in a harvester period of time that is less than half of the period of the timer with the shortest cycle in the locked subset of the second cache;
and wherein determining comprises:
detecting the classes of the objects that are associated with the references in the locked subset of the second cache;
verifying the cycle of the associated timer for each reference that is associated with a different class of object; and
checking the timers of the references by comparing the current value of a timer to the verified cycle of that timer.

6. The method of claim 3 wherein objects in the first cache are managed objects representing the components in a storage area network, the method comprising:
receiving a signal indicating that a managed object in the first cache has been accessed;
detecting the class of the accessed managed object and the cycle of the timer associated with the reference that is associated with the accessed managed object; and
resetting the timer associated with a reference in the second cache that is associated with the accessed managed object in the first cache, wherein the cycle of the timer depends on the class of the accessed managed object.

7. The method of claim 1, wherein locking the subset of the second cache includes locking a portion of the second cache, the portion of the second cache currently containing multiple references to respective objects in the first cache.

8. The method of claim 1, comprising:
wherein removing any such reference from the second cache includes:
removing a unique reference paired with a corresponding object in the first cache;
wherein deleting any objects from the first cache includes:
deleting the corresponding object paired with the unique reference; and
re-using the unique reference in the second cache upon detecting the corresponding object paired with the unique reference is subsequently loaded back into the first cache.

9. The method of claim 1, wherein associating each reference in the second cache with a timer includes:

determining a first object in the first cache is accessed less frequently than a second object in the first cache; and
based on an access frequency of the first object being less than an access frequency of the second object, associating a first reference to the first object with a first timer, the first timer comprising a longer cycle than a cycle of a second timer associated with a second reference to the second object, the first reference and the second reference in the second cache.

10. The method of claim 5, wherein deleting any objects from the first cache that do not have an associated reference in the second cache occurs in conjunction with the steps of detecting, verifying and checking.

11. A computer system comprising:
a memory;
a processor;
a display;
an interconnection mechanism coupling the memory, the processor and the display allowing communication there between;
wherein the memory is encoded with a removal application, that when executed in the processor, provides a removal process that removes an object from a first cache, wherein each object in the first cache is associated with a reference in a second cache, by causing the computer system to perform the operations of:
associating each reference in the second cache with a timer;
locking a subset of the second cache;
determining those references in the locked subset of the second cache that have associated timers that have timed out;
removing any such reference from the second cache; and
deleting any objects from the first cache that do not have an associated reference in the second cache;
wherein the objects in the first cache belong to different classes of objects, each class corresponding to a particular type of Storage Area Network component, and that additionally performs operations of:
organizing the references in the second cache according to the class of their respective associated object in the first cache.

12. The computer system of claim 11 wherein associating comprises:
associating each reference in the second cache with a timer, wherein the timer associated with a reference depends on a class of the object that the reference is associated with.

13. The computer system of claim 12 comprising:
performing the steps of locking, determining, and removing for each subset of the second cache in a harvester period of time.

14. The computer system of claim 13 wherein performing comprises:
performing the steps of locking, determining, and removing for each subset of the second cache in a harvester period of time that is less than half of the period of the timer with the shortest cycle in the locked subset of the second cache;
and wherein determining comprises:
detecting the classes of the objects that are associated with the references in the locked subset of the second cache;
verifying the cycle of the associated timer for each reference that is associated with a different class of object; and
checking the timers of the references by comparing the current value of a timer to the verified cycle of that timer.

15. The computer system of claim 11 wherein objects in the first cache are managed objects representing the components in a storage area network, wherein the computer system additionally performs operations of:
- receiving a signal indicating that a managed object in the first cache has been accessed;
- detecting the class of the accessed managed object and the cycle of the timer associated with the reference that is associated with the accessed managed object; and
- resetting the timer associated with a reference in the second cache that is associated with the accessed managed object in the first cache, wherein the cycle of the timer depends on the class of the accessed managed object.

16. A computer program product, stored on computer readable medium, to remove an object from a first cache, wherein each object in the first cache is associated with a reference in a second cache, comprising:
- computer program code for associating each reference in the second cache with a timer;
- computer program code for locking a subset of the second cache;
- computer program code for determining those references in the locked subset of the second cache that have associated timers that have timed out;
- computer program code for removing any such reference from the second cache; and
- computer program code for deleting any objects from the first cache that do not have an associated reference in the second cache;

wherein the objects in the first cache belong to different classes of objects, each class corresponding to a particular type of Storage Area Network component, and the computer program product comprises:
- computer program code for organizing the references in the second cache according to the class of their respective associated object in the first cache.

17. The computer program product of claim 16 wherein computer program code for associating comprises:
- computer program code for associating each reference in the second cache with a timer, wherein the timer associated with a reference depends on a class of the object that the reference is associated with.

18. The computer program product of claim 17 wherein computer program code for associating comprises:
- computer program code for associating each reference in the second cache with a timer, wherein the cycle of the timer associated with a reference depends on the class of the object that the reference is associated with.

19. The computer program product of claim 17 comprising:
- computer program code for performing the steps of locking, determining, and removing for each subset of the second cache in a harvester period of time.

20. The computer program product of claim 19 wherein computer program code for performing comprises:
- computer program code for performing the steps of locking, determining, and removing for each subset of the second cache in a harvester period of time that is less than half of the period of the timer with the shortest cycle in the locked subset of the second cache;

and wherein computer program code for determining comprises:
- computer program code for detecting the classes of the objects that are associated with the references in the locked subset of the second cache;
- computer program code for verifying the cycle of the associated timer for each reference that is associated with a different class of object; and
- computer program code for checking the timers of the references by comparing the current value of a timer to the verified cycle of that timer.

21. The computer program product of claim 20 wherein objects in the first cache are managed objects representing the components in a storage area network, comprising:
- computer program code for receiving a signal indicating that a managed object in the first cache has been accessed;
- computer program code for detecting the class of the accessed managed object and the cycle of the timer associated with the reference that is associated with the accessed managed object; and
- computer program code for resetting the timer associated with a reference in the second cache that is associated with the accessed managed object in the first cache, wherein the cycle of the timer depends on the class of the accessed managed object.

* * * * *